UNITED STATES PATENT OFFICE 1,995,555

PROCESS FOR THE PRODUCTION OF COPPER-SULPHATE

Hans Weidmann, Frankfort-on-the-Main, Germany, assignor to American Lurgi Corporation, New York, N. Y., a corporation of New York No Drawing. Application October 8, 1932, Serial No. 636,950. In Germany October 19, 1931

10 Claims. (Cl. 23—125)

This invention relates to a process for the production of copper sulphate by the action of sulphurous acid on cupric oxide or metallic copper, in presence of oxygen, and aims at providing a process in which—inter alia—the sulphur dioxide contained in gases, such as the roasting-furnace gases of copper smelters and the like, is rendered harmless and, at the same time, utilized to advantage.

Hitherto, the chief method of producing copper sulphate on a commercial scale has been to dissolve cupric oxide or copper scale in sulphuric acid. It has also been proposed to produce copper sulphate by allowing gases containing sulphur dioxide to act, in conjunction with air, on granulated copper. This action, however, proceeds at an extremely slow rate.

It has been ascertained in accordance with the present invention, that the action of sulphurous acid, or sulphur dioxide, on cupric oxide—and also on metallic copper—in presence of oxygen, can be greatly accelerated by allowing the action to take place in the presence of halogen-ions. For example, cupric oxide, or metallic copper (such as cementation copper), preferably in a finely divided condition, is suspended in water, or in an aqueous liquid (such as a solution containing copper sulphate) and, after the addition of halogen-ions, for example in the form of hydrochloric acid, or a chloride such as sodium chloride, ammonium chloride, manganous chloride and the like, $SO_2$ or a gas (e. g. roasting-furnace gas) containing $SO_2$ is introduced—preferably with active stirring—together with sufficient quantities of oxygen, for example in the form of air. It has been found possible, by proceeding in this manner, to remove practically the whole of the sulphur dioxide from roasting-furnace gases, even when such gases contain an extremely small amount (such as 2% and under of $SO_2$), and furthermore even in the case of such low-percentage gases the conversion of the cupric oxide or copper present into copper sulphate proceeds at a very rapid rate in consequence of the addition of halogen-ions according to the invention, so that the sulphur dioxide content in roasting-furnace gases in particular, can for the first time be utilized for the production of copper sulphate under extremely satisfactory and economic conditions. This is a matter of special importance in connection with copper smelting, where both $SO_2$-bearing, roasting-furnace gases and cupric oxide, or metallic copper, are available for the production of copper sulphate, but where there has hitherto been no possibility of utilizing the existing sulphur dioxide, its removal being nevertheless desirable in view of the injurious effects of the waste gases on vegetation.

As a modification of the foregoing procedure of passing the sulphur dioxide, or gases containing same, into a suspension of cupric oxide or metallic copper in an aqueous liquid, the reaction components according to the invention can also be brought into mutual reaction in any other convenient manner, for example by placing the cupric oxide, or metallic copper—in this case preferably in the form of coarse lumps—in a tower or the like, through which water, or an aqueous solution, is passed (for example in circulation) from above, while sulphur dioxide, or a gas containing same, in conjunction with the amount of oxygen (e. g. in the form of air) that is still required to complete the reaction, is admitted from below.

If desired, two or more of such towers, or other reaction apparatus, may be disposed in series, each of which receives the waste gases from the preceding reaction apparatus, in order to increase the rate of introduction of the gas and thus increase the throughput per unit of time, without fear of any unconverted $SO_2$ being lost.

According to the present invention, the amount of the additions containing halogen-ions is relatively small in proportion to that of the copper sulphate formed, that is to say, is small enough to preclude any undesired contamination of the final product for example of the solid copper sulphate recovered by crystallization from the solution obtained in the first place. Since, in general, quantities of even about 1 grm. or less, of halogen-ions per litre of the reaction liquid, are sufficient to produce the desired acceleration of the conversion process, it is possible, in nearly all cases, to fix the quantity of the additions containing the halogen-ions so as to prevent any precipitation of halogen compounds of copper, even when the copper sulphate formed is separated in the solid form, for example by crystallization, from the—at first hot-saturated, and then cooled—reaction solution. In these circumstances, after being separated from the crystals of copper sulphate, the mother liquor containing the rest of the copper sulphate together with the whole of the halogen-ions originally introduced, can always be returned to the decomposition process. Consequently the added halogen-ions can be utilized again and again in circulation.

The conversion, according to the present invention, is preferably carried on at elevated temperature.

When roasting-furnace gases are employed, the desired elevation of the temperature can be obtained, for example, by bringing the gases into reaction with the reaction liquid at the temperature at which they issue from the roasting furnace.

In the first described method of carrying out the process of the invention, i. e. by passing $SO_2$, or gases containing same—such as roasting-furnace gases low in $SO_2$—into an aqueous liquid containing cupric oxide, or metallic copper, in suspension, it has been found particularly advantageous that, at least the additional oxygen (e. g. in the form of air) admitted, either separately or in conjunction with the sulphur dioxide—and, if desired, the sulphur dioxide, or gases containing same, for example in admixture with oxygen or air—should be introduced in a finely divided state into the reaction liquid. This can be effected, for example, by passing the introduced gases through porous materials, such as microporous filter slabs or the like—forming, for example, or laid in, the bottom of the reaction apparatus. In such event, the degree of distribution and the velocity of the admitted gases is preferably arranged so that at least a portion of the liquid is converted into foam.

*Example*

A solution of 6.6 kgs. of sodium chloride in 2 cu. metres of water (=3.3 grms. of NaCl per litre) is circulated, by means of a pump, through a dissolving tower charged with suitable fillers for distributing the liquid. In the course of 24 hours, 410 kgs. of cupric oxide, in the form of roasted cementation copper, is added to this solution, in portions of about 10 kgs. Roasting-furnace gas, containing 6.2% by volume of $SO_2$ and 9.8% by volume of oxygen and having the specific temperature of 80° C., is admitted into the tower from below. The gas issuing from the top of the tower still contains 1.25% by volume of $SO_2$. By passing this gas through a second tower, which is irrigated in the same manner with a reaction liquid containing NaCl, the residual $SO_2$ can be completely extracted from the gas.

The copper content of the liquid in circulation amounts, after 11 hours, to 54 grms. per litre, after 16 hours to 89.1 grms. per litre and after 28 hours to 167 grms. per litre. At the end of this period the resulting solution is drawn off, and is stirred while cooling. The deposited copper sulphate is separated from the mother liquor by suction filtration, 590 kgs. of $CuSO_4.5H_2O$ being obtained. The mother liquor can be employed as originating solution in a further conversion process.

I claim:—

1. A process for the production of cupric sulphate which consists in treating a substance of the group consisting of metallic copper and oxidic copper compounds in the presence of water and of a relatively small amount of halogen ion with sulphurous acid and oxygen to bring the copper into solution in the form of cupric sulphate.

2. A process for the production of cupric sulphate which consists in treating a substance of the group consisting of metallic copper and oxidic copper compounds in the presence of water and of a relatively small amount of halogen ion with a gas containing sulphur dioxide and oxygen to bring the copper into solution in the form of cupric sulphate.

3. A process for the production of cupric sulphate which consists in treating at elevated temperature a substance of the group consisting of metallic copper and oxidic copper compounds in the presence of water and of a relatively small amount of halogen ion with sulphurous acid and oxygen to bring the copper into solution in the form of cupric sulphate.

4. A process for the production of cupric sulphate which consists in treating a substance of the group consisting of metallic copper and oxidic copper compounds in the presence of water and of a relatively small amount of a soluble chloride with sulphurous acid and oxygen to bring the copper into solution in the form of cupric sulphate.

5. A process for the production of cupric sulphate which consists in treating a substance of the group consisting of metallic copper and oxidic copper compounds in the presence of water and of a relatively small amount of sodium chloride with sulphurous acid and oxygen to bring the copper into solution in the form of cupric sulphate.

6. A process for the production of cupric sulphate which consists in treating a substance of the group consisting of metallic copper and oxidic copper compounds in the presence of water and of a relatively small amount of a compound of copper and chlorine with sulphurous acid and oxygen to bring the copper into solution in the form of cupric sulphate.

7. A process for the production of cupric sulphate which consists in treating metallic copper in the presence of water and of a relatively small amount of halogen ion with a gas consisting partly at least of sulphur dioxide together with a gas consisting partly at least of oxygen to bring the copper into solution in the form of cupric sulphate.

8. A process for the production of cupric sulphate which consists in treating cupric oxide in the presence of water and of a relatively small amount of halogen ion with a gas consisting partly at least of sulphur dioxide together with a gas consisting partly at least of oxygen to bring the copper into solution in the form of cupric sulphate.

9. A process for the production of cupric sulphate which consists in treating a substance of the group consisting of metallic copper and oxidic copper compounds in the presence of water and of a relatively small amount of halogen ion with a gas consisting partly at least of sulphur dioxide together with a gas consisting partly at least of oxygen to bring the copper into solution in the form of cupric sulphate the oxidizing gas at least being passed into the liquid in a state of fine subdivision.

10. A process for the production of cupric sulphate which consists in treating a substance of the group consisting of metallic copper and oxidic copper compounds in the presence of water and of a relatively small amount of halogen ion with a gas consisting partly at least of sulphur dioxide together with a gas consisting partly at least of oxygen to bring the copper into solution in the form of cupric sulphate the oxidizing gas at least being passed into the liquid in such a degree of subdivision and with such a speed that the liquid present is converted partly at least into foam.

HANS WEIDMANN.